(12) United States Patent
Ogawa (10) Patent No.: US 7,949,278 B2
(45) Date of Patent: May 24, 2011

(54) APPARATUS FOR REGISTERING A PREDETERMINED NUMBER OF JOBS SIMULTANEOUSLY

(75) Inventor: Kenichiro Ogawa, Hadano (JP)

(73) Assignee: Seiko Epson Corporation, Tokyo (JP)

( * ) Notice: Subject to any disclaimer, the term of this patent is extended or adjusted under 35 U.S.C. 154(b) by 421 days.

(21) Appl. No.: 12/084,744

(22) PCT Filed: Oct. 27, 2006

(86) PCT No.: PCT/JP2006/321474
§ 371 (c)(1),
(2), (4) Date: May 8, 2008

(87) PCT Pub. No.: WO2007/055111
PCT Pub. Date: May 18, 2007

(65) Prior Publication Data
US 2009/0252522 A1    Oct. 8, 2009

(30) Foreign Application Priority Data
Nov. 9, 2005  (JP) .................................. 2005-324726

(51) Int. Cl.
*B41J 29/38* (2006.01)
(52) U.S. Cl. ......................................................... 399/82
(58) Field of Classification Search .................... 399/82; 358/1.15, 1.13
See application file for complete search history.

(56) References Cited

U.S. PATENT DOCUMENTS

| 7,100,198 | B2 | 8/2006 | Kurishita et al. | |
| 2003/0231329 | A1 | 12/2003 | Edmonds et al. | |
| 2004/0190057 | A1 | 9/2004 | Takahashi et al. | |
| 2006/0001908 | A1* | 1/2006 | Ohta | 358/1.15 |
| 2006/0238797 | A1* | 10/2006 | Berglin | 358/1.15 |
| 2008/0181651 | A1* | 7/2008 | Takesada et al. | 399/82 |

FOREIGN PATENT DOCUMENTS

| EP | 1229724 A2 | 8/2002 |
| JP | 02-157927 | 6/1990 |
| JP | 07-178971 | 7/1995 |
| JP | 09-282123 | 10/1997 |
| JP | 09-286154 | 11/1997 |

(Continued)

OTHER PUBLICATIONS

The extended European Search Repprt No. 06 83 2398 dated Aug. 31, 2009. (8 pages).

*Primary Examiner* — Quana M Grainger
(74) *Attorney, Agent, or Firm* — Nutter McClennen & Fish LLP; John J. Penny, Jr.

(57) ABSTRACT

A recording apparatus connected to a computer executes jobs in a desired order at the time of carrying out plural jobs transmitted from the computer. A printer for carrying out plural jobs transmitted from the computer and recording an image on a recording medium registers the jobs transmitted from the computer as object jobs corresponding to a first LED and a second LED for displaying job states and a first instruction button 21 and a second instruction button for inputting operations of carrying out the registered jobs, executes the job corresponding to the operated button in response to the operation of the first instruction button or the second instruction button, and gives notification using the first LED or the second LED corresponding to the job.

3 Claims, 6 Drawing Sheets

FOREIGN PATENT DOCUMENTS

| | | |
|---|---|---|
| JP | 10-091373 | 4/1998 |
| JP | 2000-194525 | 7/2000 |
| JP | 2000-309148 | 11/2000 |
| JP | 2001-034140 | 2/2001 |
| JP | 2002-052792 | 2/2002 |
| JP | 2002-207574 | 7/2002 |
| JP | 2002207574 A | 7/2002 |
| JP | 2002237933 A | 8/2002 |
| JP | 2002-254772 | 9/2002 |
| JP | 2003-54082 | 2/2003 |
| JP | 2003-131854 | 5/2003 |
| JP | 2003-150355 | 5/2003 |
| JP | 2003131854 A | 5/2003 |
| JP | 2003-296065 | 10/2003 |
| JP | 2004-310746 | 11/2004 |
| JP | 2005-297441 | 10/2005 |

* cited by examiner

| JOB STATE | REGISTRATION STATE OF JOB 1 | REGISTRATION STATE OF JOB 2 | LIGHTING STATE OF LED IN WAITING STATE | LIGHTING STATE IN OPERATING 1ST INSTRUCTION BUTTON | LIGHTING STATE IN OPERATING 2ND INSTRUCTION BUTTON |
|---|---|---|---|---|---|
| (a) | ID INFORMATION OF COMPUTER: 3A / ID INFORMATION OF JOB: 001 | NONE | 1ST LED: ● / 2ND LED: ○ | 1ST LED: ● / 2ND LED: ○ | NO CHANGE IN WAITING STATE |
| (b) | ID INFORMATION OF COMPUTER: 3A / ID INFORMATION OF JOB: 001 | ID INFORMATION OF COMPUTER: 3A / ID INFORMATION OF JOB: 002 | 1ST LED: ● / 2ND LED: ○ | 1ST LED: ● / 2ND LED: ○ | NO CHANGE IN WAITING STATE |
| (c) | NONE | ID INFORMATION OF COMPUTER: 3A / ID INFORMATION OF JOB: 002 | 1ST LED: ● / 2ND LED: ○ | 1ST LED: ● / 2ND LED: ○ | NO CHANGE IN WAITING STATE |
| (d) | ID INFORMATION OF COMPUTER: 3B / ID INFORMATION OF JOB: 001 | ID INFORMATION OF COMPUTER: 3A / ID INFORMATION OF JOB: 002 | 1ST LED: ● / 2ND LED: ● | 1ST LED: ● / 2ND LED: ○ | 1ST LED: ○ / 2ND LED: ● |
| (e) | ID INFORMATION OF COMPUTER: 3B / ID INFORMATION OF JOB: 001 | NONE | 1ST LED: ○ / 2ND LED: ● | NO CHANGE IN WAITING STATE | 1ST LED: ○ / 2ND LED: ● |
| (f) | NONE | NONE | 1ST LED: ○ / 2ND LED: ○ | NO CHANGE IN WAITING STATE | NO CHANGE IN WAITING STATE |

○: TURN OFF, ●: TURN ON

APPARATUS FOR REGISTERING A PREDETERMINED NUMBER OF JOBS SIMULTANEOUSLY

TECHNICAL FIELD

The present invention relates to a recording apparatus for receiving and executing a job transmitted from a computer, a computer for transmitting a job to the recording apparatus, and a recording system having the recording apparatus and the computer.

BACKGROUND ART

A system in which a recording apparatus is connected to plural computers, the priority order of recording is set up in the computers, and jobs transmitted from the computers are executed by the recording apparatus in accordance with the priority order was known in the past (for example, see Patent Document 1).

As a method of managing jobs transmitted from plural computers, an image forming apparatus that can check or edit registered jobs on a thumbnail display screen is disclosed in Patent Document 2. An image forming apparatus that can dispose a queue common to all the applications as well as register a job in a queue disposed for each application and can confirm states of queued jobs from an operation panel is disclosed in Patent Document 3. A print job managing device that has registration means for registering a job for each application and that is configured to perform a printing operation in the order of registration is disclosed in Patent Document 4.

An image forming apparatus that calculates a regular waiting time required for printing out image data, calculates a second waiting time by means of a subtraction from the regular waiting time, and displays the regular waiting time or the second waiting time on an LCD is disclosed in Patent Document 5. An image forming system having an order and document receiving manager for receiving jobs, a proof manager for proofing whether document data from a client is edited in accordance with a printout condition, and a print manager for rasterizing the proofed job and outputting the rasterized job from an image forming apparatus is disclosed in Patent Document 6.

Since the image forming system described in Patent Document 6 is configured to transmit the job process to the print manager in the next stage in response to an input of an acceptance instruction for the job proofing result, a job received by the order and document receiving manager is not sequentially executed, but a printing operation of a job is performed in response to the acceptance instruction for the job proofing result.

Patent Document 1: Japanese Patent Publication No. 2-157927A
Patent Document 2: Japanese Patent Publication No. 2005-297441A
Patent Document 3: Japanese Patent Publication No. 2003-296065A
Patent Document 4: Japanese Patent Publication No. 2002-254772A
Patent Document 5: Japanese Patent Publication No. 2001-034140A
Patent Document 6: Japanese Patent Publication No. 2004-310746A

DISCLOSURE OF THE INVENTION

Problems to be Solved by the Invention

When the priority order of the computers is determined as described in Patent Document 1, it is not possible to know when the jobs of the computer having a low priority should be executed. Accordingly, for example, when a special sheet used in a certain job is set in a recording apparatus and then a job not using the sheet is transmitted from a computer having a higher priority, the special sheet is wasted. In order to avoid such a situation, it is necessary to know in what order the jobs transmitted from the computers should be executed. However, in the past, an operator should manually check the order, thereby imposing a large burden on the operator.

The invention is contrived in view of the above-mentioned situations. An object of the invention is to carry out jobs in a desired order when a recording apparatus connected to computers executes plural jobs transmitted from the computers.

Means for Solving the Problem

In order to accomplish the above-mentioned object, according to an aspect of at least one embodiment of the invention, there is provided a recording apparatus that executes jobs received from a computer and records an image on a recording medium, the recording apparatus including: registration means for receiving an instruction to register the jobs from the computer and registering the received jobs as object jobs; an operation unit for inputting an operation of instructing to execute the jobs registered by the registration means; notification means for notifying states of the jobs registered by the registration means; and request means for requesting the computer to transmit data of the job of which the execution is instructed by means of the operation of the operation unit, wherein the job corresponding to the operation of the operation unit is executed in response to the operation and a notification is given from the notification means to correspond to the job.

According to this configuration, since the jobs transmitted from the computer are registered, the job instructed by means of the operation of the operation unit among the registered jobs is executed, and the execution is notified by the notification means corresponding to the executed job, an operator can designate the execution order of jobs by operating the operation unit and can know the job under execution on the basis of the notification from the notification means. Accordingly, it is possible to execute plural jobs in a desired order and to know the execution order, thereby satisfactorily preventing the jobs from being executed in an unintended order.

The registration means may receive instructions to register the jobs from a plurality of computers and register the received jobs. In this case, the request means may request the computer, which has given an instruction to register the job of which the execution is instructed by means of the operation of the operation unit, to transmit data of the job. According to this configuration, since the recording apparatus does not receive the data of a job in a state where the jobs are registered in the recording apparatus, it is not necessary to have a large-capacity memory area for storing the data of a job in the recording apparatus. Accordingly, it is possible to easily embody a recording apparatus having a function of registering plural jobs at low cost without any waste.

The registration means may receive instructions to register the jobs from a plurality of the plurality of computers and register the received jobs. Here, the request means may request the computer, which has given an instruction to register the job of which the execution is instructed by means of the operation of the operation unit, to transmit data of the job. In this case, the plural jobs transmitted from the plurality of computers can be executed in an order instructed by an operator. Since the recording apparatus does not receive the data of a job in a state where the jobs transmitted from the plurality of computers are registered, it is not necessary to include a large-capacity memory area for storing the data of a job in the recording apparatus. Accordingly, it is possible to easily embody a recording apparatus having a function of registering plural jobs at low cost without any waste.

The registration means may register the received jobs as object jobs using a predetermined number as an upper limit, the notification means may include the predetermined number of display units for displaying states of the jobs registered by the registering means, respectively, and the operation unit may include the predetermined number of job operating units corresponding to the jobs registered by the registration means, respectively. When one of the job operating units is operated, the job corresponding to the job operating unit may be executed and a display state of the display unit corresponding to the job may be changed. In this case, since the number of display units and job operating units corresponds to the predetermined number of jobs which can be registered in the recording apparatus, the operator can operate the job operating unit corresponding to the job to be executed among the registered jobs and check the display state of the display unit corresponding to the job. Accordingly, since an intuitive operation is possible, it is possible to enhance the operability.

According to another aspect of at least one embodiment of the invention, there is provided a computer for recording an image by transmitting a job to a recording apparatus connected to an external device to execute the job, the computer including: instruction transmitting means for transmitting an instruction to register the job as an object job to the recording apparatus before transmitting data of the job; and job data transmitting means for transmitting the data of the job when the data of the job is requested by the recording apparatus in response to the instruction transmitted by the instruction transmitting means.

According to this configuration, an instruction to register a job is first transmitted at the time of transmitting the job to the recording apparatus and the data of the job is transmitted when the data of the job is requested by the recording apparatus. Accordingly, it is not necessary to provide the recording apparatus with a memory area for storing the data of jobs in advance and it is possible to reduce the amount of information to be transmitted at the time of registering a job in the recording apparatus, thereby realizing a high-speed process.

In the invention, the recording apparatus may be configured to register the object jobs using a predetermined number as an upper limit and when the number of jobs to be executed by the recording apparatus is greater than the predetermined number, the transmission of the instruction from the instruction transmitting means may be stopped for the jobs more than the predetermined number. According to this configuration, when the number of jobs which can be registered as the object jobs in the recording apparatus has the upper limit, the jobs greater than the upper limit are not instructed, thereby suppressing the load on the recording apparatus.

According to another aspect of at least one embodiment of the invention, there is provided a recording system comprising a computer for transmitting data of a job and a recording apparatus for recording an image on a recording medium by executing the job received from the computer, wherein the recording apparatus includes: registration means for registering received jobs as object jobs; an operation unit for inputting an operation of instructing the execution of the jobs registered by the registration means; notification means for notifying states of the jobs registered by the registration means; and request means for requesting the computer to transmit the data of the job of which the execution is instructed by means of the operation of the operation unit. Here, the job corresponding to the operation of the operation unit is executed in response to the operation and a notification is given from the notification means to correspond to the job.

According to this configuration, since the jobs transmitted from the computer are registered in the recording apparatus, the job instructed by means of the operation of the operation unit among the registered jobs is executed, and the display state corresponding to the executed job is changed, an operator can designate the execution order of jobs by operating the operation unit of the recording apparatus and can know the job under execution on the basis of the notification from the notification means. Accordingly, it is possible to execute plural jobs in a desired order and to know the execution order, thereby satisfactorily preventing the jobs from being executed in an unintended order.

In at least one embodiment of the invention, the computer may include: instruction transmitting means for transmitting an instruction to register the job as an object job to the recording apparatus before transmitting data of the job; and job data transmitting means for transmitting the data of the job when the data of the job is requested by the recording apparatus in response to the instruction transmitted by the instruction transmitting means. Here, the registration means of the recording apparatus may receive an instruction to register the object jobs from the computer and register the jobs. In this case, an instruction to register a job is first transmitted when the job is transmitted from the computer to the recording apparatus and the data of the job is transmitted when the data of the job is requested by the recording apparatus. Accordingly, it is not necessary to provide the recording apparatus with a memory area for storing the data of jobs in advance and it is possible to reduce the amount of information to be transmitted at the time of registering a job in the recording apparatus, thereby realizing a high-speed process.

ADVANTAGES OF THE INVENTION

According to at least one embodiment of the invention, since the jobs transmitted from the computer are registered in the recording apparatus, the job instructed by means of the operation of the operation unit among the registered jobs is executed, and the execution is notified by the notification means corresponding to the executed job, an operator can designate the execution order of jobs by operating the operation unit and can know the job under execution on the basis of the notification from the notification means.

DESCRIPTION OF REFERENCE NUMERALS AND SIGNS

1: PRINTER (PRINTING APPARATUS)
3A, 3B: COMPUTER
11: CONTROLLER (REGISTRATION MEANS, REQUEST MEANS)
20: CONTROL PANEL (NOTIFICATION MEANS, OPERATION UNIT)
21: FIRST INSTRUCTION BUTTON (JOB OPERATING UNIT)
22: SECOND INSTRUCTION BUTTON (JOB OPERATING UNIT)
23: POWER SUPPLY SWITCH
24: FIRST LED (DISPLAY UNIT)
25: SECOND LED (DISPLAY UNIT)
30: APPLICATION
31: CPU (INSTRUCTION TRANSMITTING MEANS, JOB DATA TRANSMITTING MEANS)
39A, 39B: SPOOLER

BEST MODE FOR CARRYING OUT THE INVENTION

Hereinafter, embodiments of the invention will be described with reference to the drawings.

Figure 1:
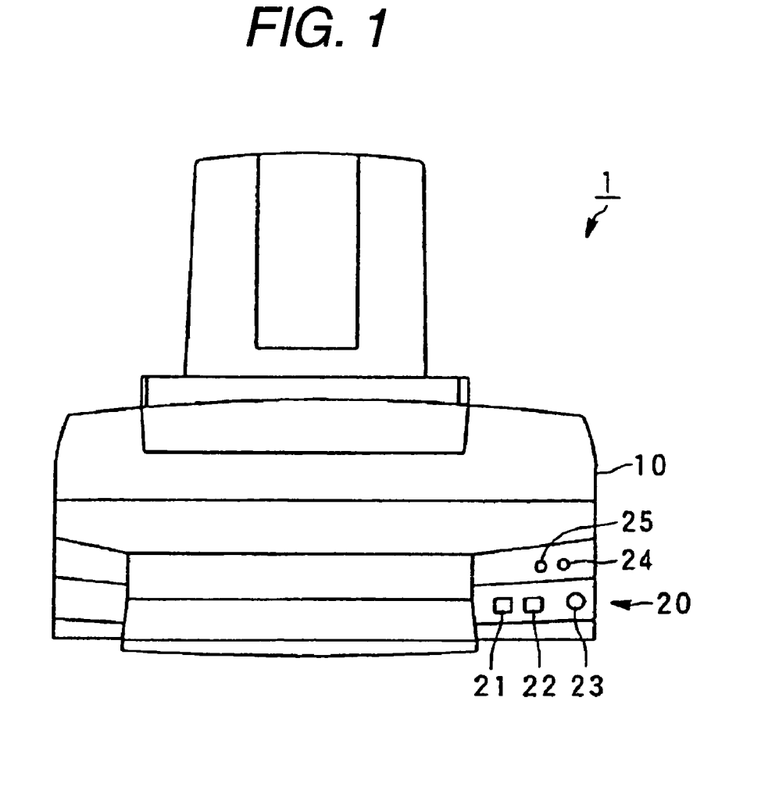
FIG. 1 is a diagram illustrating an appearance of a printer according to an embodiment of the invention.

FIG. 1 is a diagram illustrating an appearance of a printer 1 as a printing apparatus according to an embodiment of the invention. The printer 1 shown in FIG. 1 is an apparatus which is connected to plural computers as described with reference to FIG. 2 and which serves to execute jobs transmitted from the plural computers to record (print) an image including characters on a recording medium of a paper or resin sheet. Each job includes at least a command for instructing various printing operations and data of an image (hereinafter, referred to as "data of a job") to be printed on the recording medium. The printer 1 performs a printing operation in accordance with the job.

Here, an example of the recording medium can include a cut sheet cut in a predetermined size or a continuous sheet having a predetermined length. An example of the cut sheet includes a copying paper or a book including plural sheets in addition to a single sheet. The continuous sheet may be a single sheet or plural sheets overlapping with each other, a rolled sheet, or a folded sheet.

The front surface of a chassis 10 of the printer 1 is provided with a control panel 20 which is operated by an operator operating the printer 1. The control panel 20 serving as the notification means and the operation unit includes a power supply switch 23 for turning on/off the printer 1, a first instruction button 21 and a second instruction button 22 as the job operating units which are operated to instruct the execution of a job, and a first LED (light emitting diode) 24 and a second LED 25 as the display units indicating states of the jobs.

Figure 2:
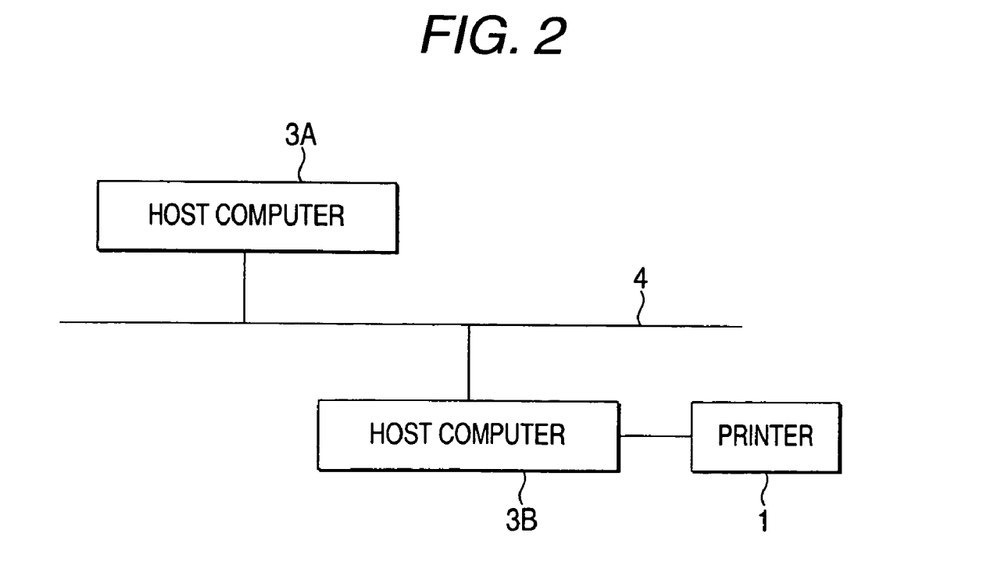
FIG. 2 is a diagram illustrating a configuration of a recording system employing a printer according to the embodiment.

FIG. 2 is a diagram illustrating a configuration of a recording system in which computers 3A and 3B are connected to the printer 1 shown in FIG. 1.

In the example shown in FIG. 2, the printer 1 is connected to the computer 3B among the computers 3A and 3B connected to a network 4. The printer 1 is shared over the network 4 and a job may be transmitted from the computer 3A to the printer 1 to perform a printing operation.

Figure 3:
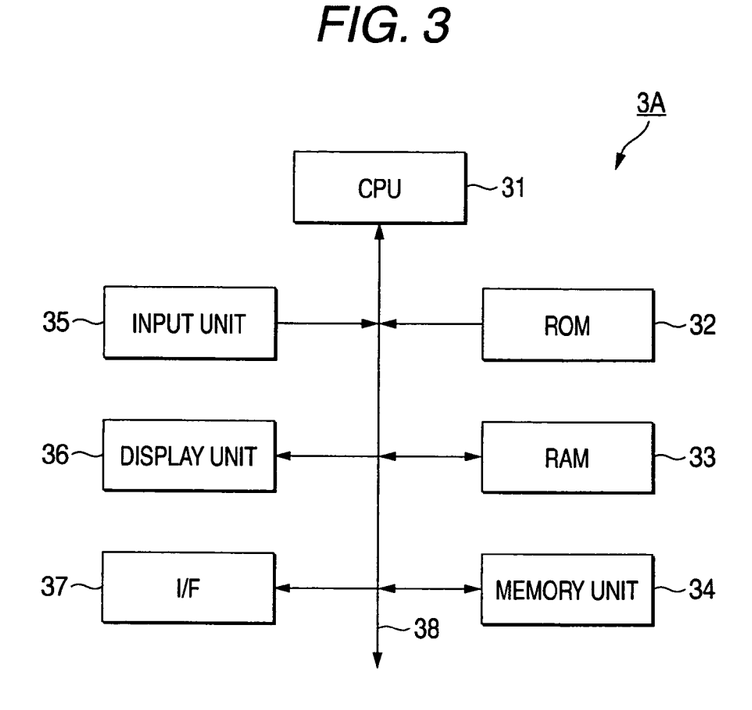
FIG. 3 is a block diagram illustrating a functional configuration of a computer.

FIG. 3 is a block diagram illustrating a functional configuration of the computers 3A and 3B. Since the computers 3A and 3B have the same configuration, only the configuration of the computer 3A is shown in FIG. 3.

As shown in FIG. 3, the computer 3A includes a CPU (Central Processing Unit) 31 for controlling respective units, a ROM (Read Only Memory) 32 for storing basic control programs executed by the CPU 31, a RAM (Random Access Memory) 33 having a work area for various programs executed by the CPU 31 and data, a memory unit 34 for storing application programs executed by the CPU 31 and data, an input unit 35 for generating operation information in response to an operation of an operator, a display unit 36 for displaying various pictures under the control of the CPU 31, and an interface (I/F) 37 for connection to different devices. The respective units are connected to each other through a bus 38.

The I/F 37 includes a network interface for connection to the network 4 and an interface for connection to the printer 1.

The CPU 31 of the computer 3A reads out and executes the basic control programs stored in the ROM 32 to initialize the units of the computer 3A. Thereafter, the CPU 31 reads out and executes the application programs stored in the memory unit 34 in accordance with an instruction input from the input unit 35 to perform various functions such as preparing a document. The CPU 31 generates a job and transmits the generated job to the printer 1 when a printing instruction is input from the input unit 35 in the course of executing the application programs.

Here, the CPU 31 transmits a job registration instruction for registering a job to be first executed by the printer 1. In this operation, the CPU 31 serves as the instruction transmitting means. The job registration instruction includes information for identifying the computers 3A and 3B and information for identifying the job to be registered (for example, a time stamp or a specific identification code).

When the printer 1 responds to the job registration instruction, the computer transmits data of the job to the printer 1. In this operation, the CPU 31 serves as the job data transmitting means. When a job completion notification is given by the printer 1 after the job has been completely executed, the CPU 31 transmits a job deregistration notification for deregistering the job to the printer 1.

As described above, the computer 3B has the same configuration as the computer 3A shown in FIG. 3. When receiving information from the computer 3A to the printer 1 through the network 4 connected to the I/F 37, the computer 3B transmits the information to the printer 1 through the I/F 37. Accordingly, the data of jobs and various notifications can be transmitted between the computer 3A and the printer 1.

Figure 4:
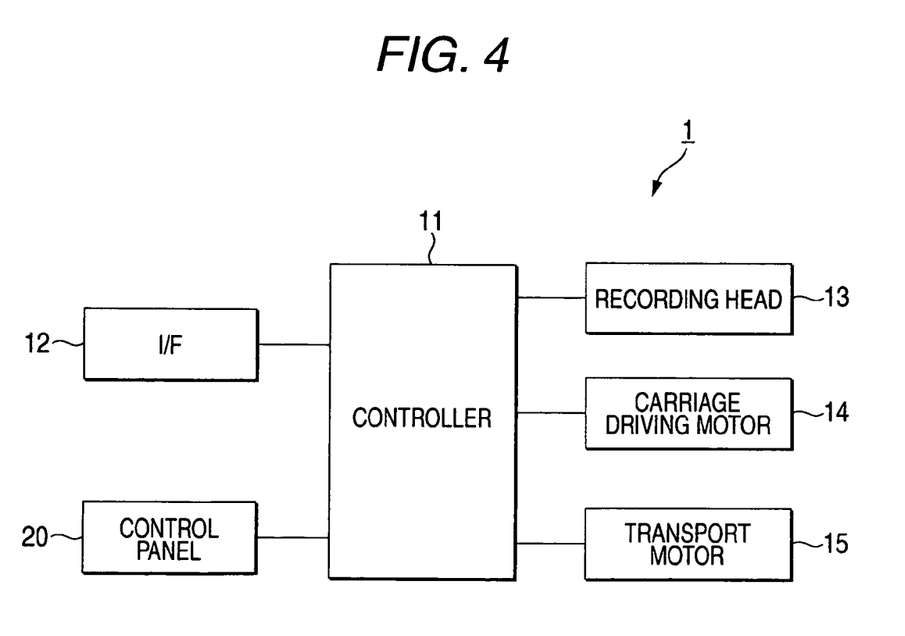
FIG. 4 is a block diagram illustrating a functional configuration of the printer.

FIG. 4 is a block diagram illustrating a functional configuration of the printer 1. The printer 1 may have another functional unit not shown in FIG. 4.

As shown in FIG. 4, the printer 1 includes a controller 11 for controlling the units of the printer 1, an I/F 12 for connection to the computer 3B, a recording head 13 for printing an image on a recording medium, a carriage driving motor 14 for moving a carriage mounted with the recording head 13, a transport motor 15 for transporting the recording medium during the operation of printing an image by the use of the recording head 13, and a control panel 20 disposed in the chassis 10 (FIG. 1) of the printer 1.

The controller 11 executes a job received through the I/F 12 and performs a function of printing an image on a recording medium by driving the recording head 13, the carriage driving motor 14, and the transport motor 15.

When receiving the jobs registration instruction transmitted from the computers 3A and 3B through the I/F 12 before transmitting the job, the controller 11 assigns numbers of job 1 and job 2 to the jobs in the received order and registers the jobs as jobs to be executed. In this registration operation, the controller 11 serves as registering means and stores the information for identifying the computers 3A and 3B included in the job registration instruction and information for identifying the job to be registered in a built-in memory area (not shown).

In this embodiment, the printer 1 includes a first instruction button 21, a second instruction button 22, a first LED 24, and a second LED 25 corresponding to two jobs and can register two jobs as the upper limit. The controller 11 registers jobs 1 and 2 in the received order in response to the job registration instruction received through the I/F 12.

Subsequently, when the control panel 20 is operated by an operator and one of the first instruction button 21 corresponding to job 1 and the second instruction button 22 corresponding to job 2 is operated, the controller requests the computer, which has transmitted the job registration instruction of the job, to transmit the data of the job so as to execute the job corresponding to the operated button. In this operation, the controller 11 serves as the request means.

When the data of the job is transmitted from the computer in response to the request, the controller 11 receives the data of the job and executes the job. After printing the data of the job on the recording mediums and discharging the recording mediums, the controller 11 transmits to the computer a job completion notification indicating that the execution of the job is completed.

When a job deregistration notification is transmitted from the computer in response to the job completion notification, the controller 11 receives the job deregistration notification and deregisters the job.

As described above, two jobs can be registered as the upper limit in the printer 1. When one job (for example, job 1) is executed and thus job 1 is deregistered in a state where both jobs 1 and 2 are registered, job 1 is empty. Here, when receiving the job registration instruction from the computer, the controller 11 can register the job as the empty job 1. In this way, the printer 1 always registers a predetermined number (2 in this case) of jobs and executes the job instructed by means of the operation of the control panel 20 among the registered jobs.

Figure 5:
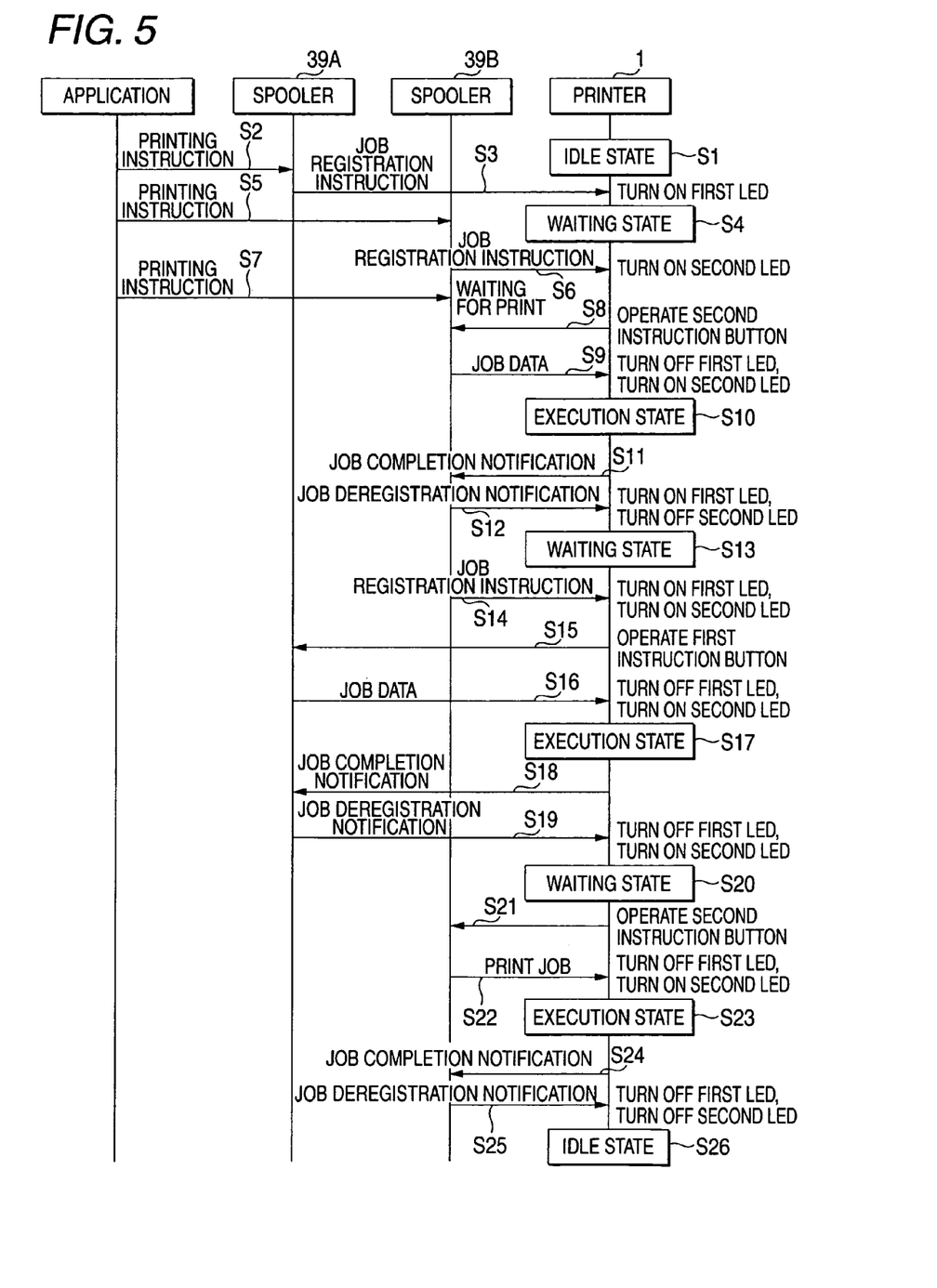
FIG. 5 is a sequence diagram illustrating operations of the printer and the computer.

FIG. 5 is a sequence diagram illustrating operations of the printer 1 and the computers 3A and 3B. Specific operations of the printer 1 and the computers 3A and 3B will be described with reference to FIG. 5.

Spoolers 39A and 39B shown in FIG. 5 serve to temporarily store jobs to be transmitted to the printer 1 in the computers 3A and 3B and to transmit the jobs to the printer at a proper time. The spoolers 39A and 39B are embodied using the memory area of the memory unit 34 (FIG. 3) by means of the function of the CPU 31 (FIG. 3) of the computers 3A and 3B.

The printer 1 enters an idle state (S1), after it is turned on and the initialization of the units of the printer 1 is completed.

When a printing instruction is given by the application program which is being executed by the computer 3A (S2), the data of the job including data of an image to be printed is stored in the spooler 39A of the computer 3A. Subsequently, the job registration instruction is transmitted to the printer 1 by the spooler 39A (S3). Then, the printer 1 registers the job of the computer 3A as job 1 to be executed and enters a waiting state by lighting the first LED 24 corresponding to job 1 (S4).

Subsequently, when a printing instruction is given by the application program which is being executed by the computer 3B (S5), the data of the job is stored in the spooler 39B of the computer 3B. Then, the job registration instruction is transmitted to the printer 1 by the spooler 39B (S6). The printer 1 registers the job of the computer 3B as job 2 to be executed and maintains the waiting state by lighting the second LED 25 corresponding to job 2.

When a new printing instruction is given by the application program which is being executed by the computer 3B (S7), the data of the job is stored in the spooler 39B, but the spooler 39B maintains the job in the waiting state until the first stored job is executed.

When the second instruction button 22 of the control panel 20 is operated by an operator, the printer 1 requests the computer 3B, which has transmitted the instruction to register job 2, to transmit the data of the job so as to start executing job 2 corresponding to the second instruction button 22 (S8).

The computer 3B transmits the data of job 2 to the printer 1 in response to the request transmitted from the printer 1 (S9). The printer 1 enters an execution state by turning on the second LED 25 corresponding to job 2 and turning off the first LED 24 corresponding to job 1 (S10). In this execution state, the printer 1 performs a printing operation on the recording medium by driving the recording head 13, the carriage driving motor 14, and the transport motor 15.

The printer 1 transmits the job completion notification to the computer 3B after the execution of the job is completed (S11). The computer 3B transmits to the printer 1 the job deregistration notification indicating that the completed job is deregistered in response to the job completion notification transmitted from the printer 1 (S12).

The printer 1 having received the job deregistration notification enters a waiting state by turning off the second LED 25 corresponding to the deregistered job 2 and turning on the first LED 24 corresponding to job 1 not executed yet (S13).

Here, the spooler 39B transmits a job registration instruction to the printer 1 (S14) so as to execute the job stored in the spooler 39B after executing the job previously stored in the spooler 39B. The printer 1 receives the job registration instruction from the computer 3B, registers the job as job 2, turns on the second LED 25 corresponding to job 2, and maintains the waiting state.

When the first instruction button 21 of the control panel 20 is operated by the operator, the printer 1 requests to the computer 3A, which has transmitted the instruction to register job 1, to transmit the data of the job (S15) so as to start executing job 1 corresponding to the first instruction button 21.

The computer 3A transmits the data of job 1 to the printer (S16) in response to the request transmitted from the printer 1. The printer 1 enters an execution state to perform a printing operation by turning on the first LED 24 corresponding to job 1 and turning off the second LED 25 corresponding to job 2 (S17).

The printer 1 transmits a job completion notification to the computer 3A when the execution of the job is completed (S18). The computer 3A transmits to the printer 1 a job deregistration notification indicating that the completed job is deregistered in response to the job completion notification transmitted from the printer 1 (S19).

The printer 1 having received the job deregistration notification enters the waiting state by turning off the first LED 24 corresponding to the deregistered job 1 and turning on the second LED 25 corresponding to job 2 not executed yet (S20).

When the second instruction button 22 of the control panel 20 is operated by the operator, the printer 1 requests the computer 3B, which has transmitted the instruction to register job 2, to start executing job 2 (S21). The computer 3B transmits the data of job 2 to the printer 1 in response to the request transmitted from the printer 1 (S22). The printer 1 enters the execution state to perform a printing operation by turning on the second LED 25 corresponding to job 2 and turning off the first LED 24 corresponding to job 1 (S23). The printer 1 transmits the job completion notification to the computer 3B (S24) after the execution of the job is completed. The computer 3B transmits to the printer 1 the job deregistration notification indicating that the completed job is deregistered in response to the job completion notification transmitted from the printer 1 (S25). The printer 1 having received the job deregistration notification enters an idle state (S26) since a job in standby does not exist after the turning off the second LED 25 corresponding to the deregistered job 2.

Figure 6:
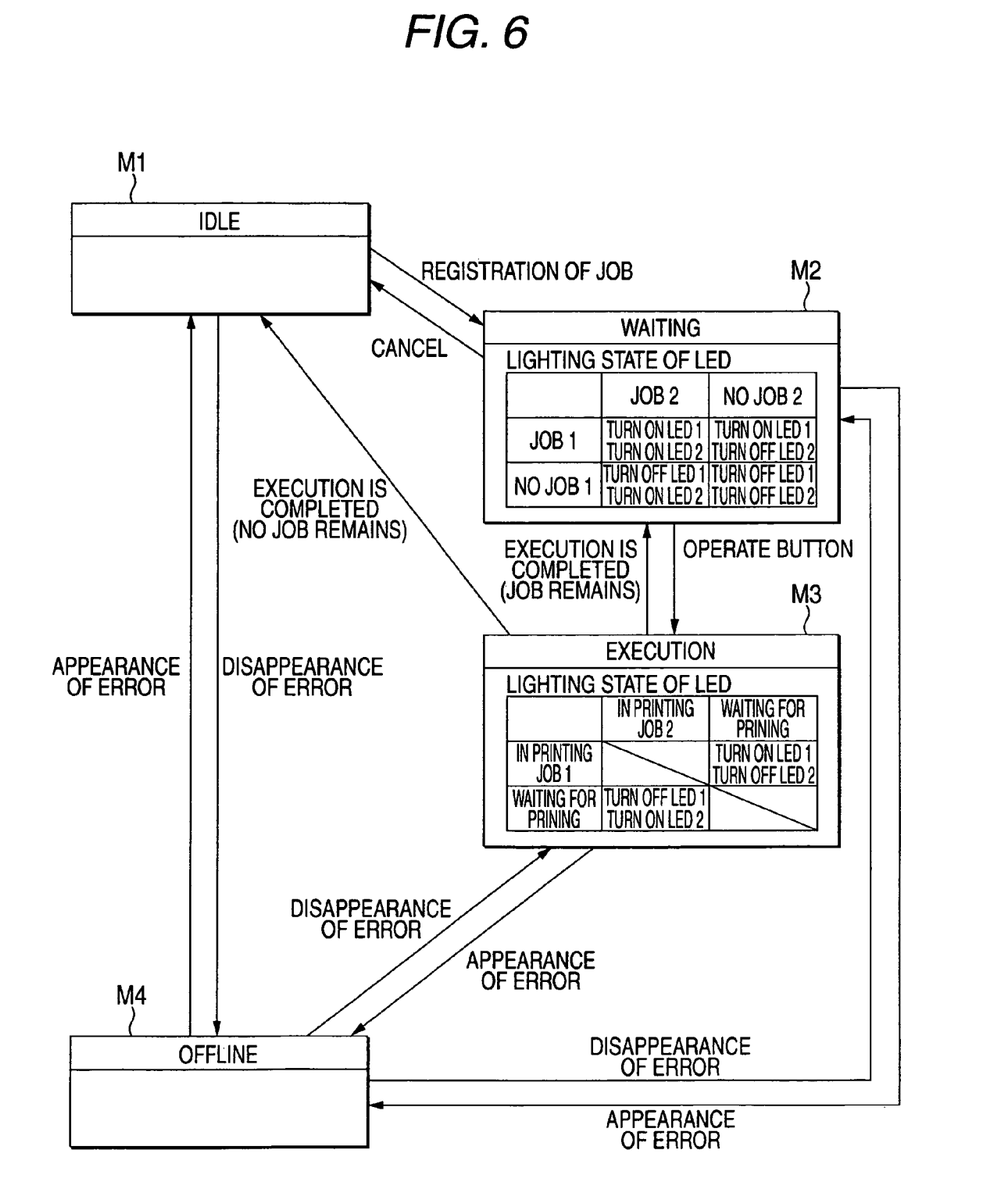
FIG. 6 is a diagram illustrating state changes of the operations of the printer.

FIG. 6 is a diagram illustrating state changes of the operations of the printer 1.

The printer 1 enters an idle state M1 when it is turned on. In the idle state M1, when receiving the job registration instructions from the computers 3A and 3B and registering the jobs, the printer 1 enters the a waiting state M2.

In the waiting state M2, the first LED 24 and the second LED 25 of the control panel 20 are turned on, depending on whether any job is registered. That is, the first LED 24 is turned on when job 1 is registered and the second LED 25 is turned on when job 2 is registered. The LED corresponding to a job not registered is turned off.

In the waiting state M2, when the first instruction button 21 or the second button 22 of the control panel 20 is operated, the printer 1 enters an execution state M3. In the execution state M3, the first LED 24 and the second LED 25 of the control panel 20 are turned on depending on the job execution state. That is, the first LED 24 is turned on during the execution of job 1, the second LED 25 is turned on during the execution of job 2, and the LED corresponding to a job not executed is turned off.

When the execution of the job is completed, the printer 1 returns to the waiting state M2 or the idle state M1 depending on whether any job not executed exists in the registered jobs. That is, the printer enters the waiting state M2 when any job not executed exists and enters the idle state M1 when any job not executed does not remain.

The operation state of the printer 1 includes an offline state M4. The offline state M4 means a state where it does not communicate with the computers 3A and 3B. The printer 1 temporarily enters the offline state M4 when an error occurs in communication between various units of the printer 1 or between the printer 1 and the computers 3A and 3B.

In the waiting state M2, when the registered job 1 and 2 are cancelled by the computers 3A and 3B, the cancelled jobs are deregistered by the printer 1. In this case, the printer 1 turns off the LED corresponding to the cancelled job. Here, when the registered job does not exist by means of the cancellation of the job, the printer 1 enters the idle state.

Modified Example

Next, operations of a printer according to a modified example will be described.

In the above-mentioned embodiment, it has been described that the job registration instructions are received in the order of the computer 3A, the computer 3B, and the computer 3B and the jobs are registered as job 1 and job 2 in the received order. In the modified example, although the jobs from different computers have been registered as job 1 and job 2, it will be described that jobs from the same computer are registered as job 1 and job 2.

Figure 7:
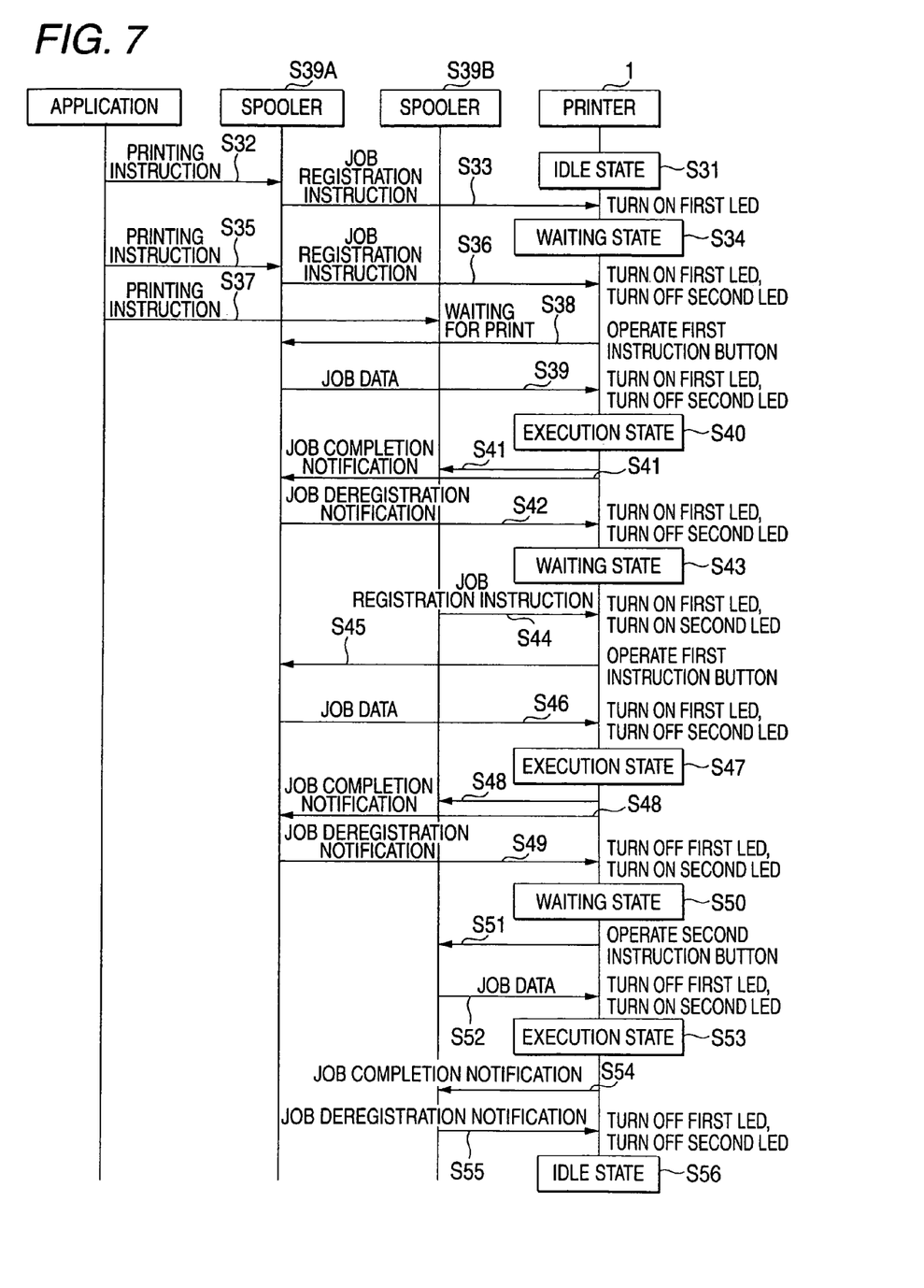
FIG. 7 is a sequence diagram illustrating operations of the printer and the computer according to a modified example.
Figure 8:
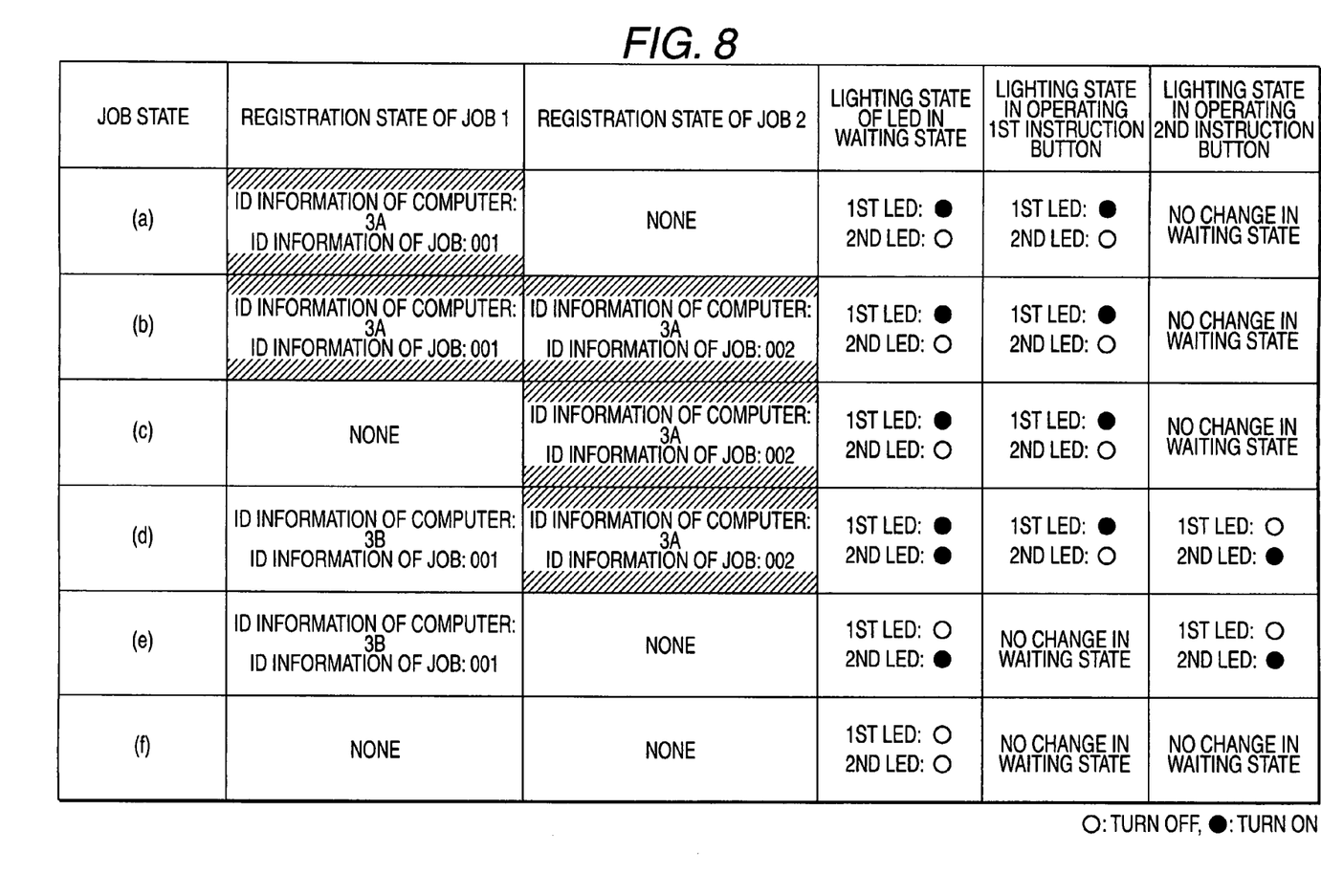
FIG. 8 is a table illustrating registration states of jobs and lighting states of LED in the registration states in the modified example.

Specifically, a case where the job registration instructions are received in the order of the computer 3A, the computer 3A, and the computer 3B and the jobs from the computer 3A are registered as job 1 and job 2 will be described with reference to FIGS. 7 and 8. FIG. 7 is a sequence diagram illustrating operations of the printer and the computers according to the modified example. FIG. 8 is a table illustrating registration states of jobs and lighting states of LEDs in the registration states in the modified example.

The printer 1 enters an idle state (S31), after it is turned on and the initialization of the units of the printer 1 is completed. When a printing instruction is given by the application program which is being executed by the computer 3A (S32), the data of the job including data of an image to be printed is stored in the spooler 39A of the computer 3A. Subsequently, the job registration instruction is transmitted to the printer 1 by the spooler 39A (S33). Then, the printer 1 registers the job of the computer 3A as job 1 to be executed and enters a waiting state by lighting the first LED 24 corresponding to job 1 (S34). The job registration instruction transmitted from the computer 3A includes, for example, at least "3A" as the identification information of the computer and "001" as the job identification information. As shown in the job state (a) of FIG. 8, only the first LED 24 is turned on and the second LED 25 is turned off in the waiting state of S34.

In addition, when the first instruction button is operated in the waiting state, the first LED 24 is turned on to indicate the execution of the job (the job with the job identification information "001" registered as job 1) transmitted from the computer 3A corresponding to the first instruction button. On the other hand, when the second instruction button is operated, the job from the computer 3B corresponding to the second instruction button is not registered yet and thus the lighting state of the second LED 25 is not changed.

When a printing instruction is given again by the application program which is being executed by the computer 3A (S35), the data of the job including data of an image to be printed is stored in the spooler 39A of the computer 3A and the job registration instruction is transmitted to the printer 1 by the spooler 39A (S36). The printer 1 registers the job from the computer 3A as job 2 to be executed. Here, the job registration instruction transmitted from the computer 3A includes, for example, at least "3A" as the identification information of the computer and "002" as the job identification information. As shown in the job state (b) of FIG. 8, since the jobs from the computer 3A are registered as both job 1 and job 2, only the first LED 24 is turned on and the second LED 25 is turned off to correspond to job 1 and job 2 of the computer 3A to be executed now.

When a new printing instruction is given by the application program which is being executed by the computer 3B (S37), the data of the job is stored in the spooler 39B, but the spooler 39B maintains the job in the waiting state until the previously registered job of the computer 3A is executed.

When the first instruction button is operated in the job state (b) of FIG. 8, the first LED 24 is turned on to indicate the execution of the job (the job with the job identification information "001" registered as job 1) transmitted from the computer 3A corresponding to the first instruction button. On the other hand, when the second instruction button is operated, the job from the computer 3B corresponding to the second instruction button is not registered yet and thus the lighting state of the second LED 25 is not changed.

When the first instruction button 21 of the control panel 20 is operated by an operator, the printer 1 requests the computer 3A, which has transmitted the instruction to register job 1, to transmit the data of the job (S38) so as to start executing the job with the job identification information "001" registered as job 1 corresponding to the first instruction button 21.

The computer 3A transmits the data of job 1 to the printer 1 in response to the request transmitted from the printer 1 (S39). The printer 1 enters the execution state to perform a printing operation by turning on the first LED 24 corresponding to job 1 of the computer 3A (S40).

The printer 1 transits the job completion notification to the computers 3A and 3B (S41) when the execution of the job is completed. The computer 3A transmits to the printer 1 the job deregistration notification indicating that the completed job is deregistered in response to the job completion notification transmitted from the printer 1 (S42).

In the printer 1 having received the job deregistration notification, as shown in the job state (c) of FIG. 8, job 1 is deregistered and becomes empty and the job "002" from the computer 3A, which is not executed, is registered as job 2. Accordingly, the first LED 24 corresponding to the job "001" from the computer 3A is turned off in response to the job deregistration notification, but the first LED 24 corresponding to the job "002" from the computer 3A which is registered as job 2 not executed yet is turned on again and the printer enters the waiting state (S43). Since the job from the computer 3B corresponding to the second instruction button is not registered yet, the second LED is kept in the off state.

In step S41, the spooler 39B having received the job completion notification transmits the job registration instruction to the printer (S44) to execute the job stored in the spooler 39B. The printer 1 receives the job registration instruction from the computer 3B, registers the received job as job 1, and turns on the second LED 25 corresponding to the job "001" from the computer 3B. That is, as shown in the job state (d) of FIG. 8, since the jobs from the computers 3A and 3B are registered in the printer 1, both the first LED 24 corresponding to the computer 3A and the second LED 25 corresponding to the computer 3B are turned on.

When the first instruction button 21 of the control panel 20 is operated by the operator, the printer 1 requests the computer 3A, which has transmitted the instruction to register the job "002", to transmit the data of the job (S45) so as to start executing the job "002" from the computer 3A corresponding to the first instruction button 21.

The computer 3A transmits the data of the job "002" to the printer 1 in response to the request transmitted from the printer 1 (S46). The printer 1 enters the execution state to perform a printing operation (S47) by turning on the first LED 24 corresponding to the computer 3A and turning off the second LED 25 corresponding to the computer 3B.

In addition, when the second instruction button 22 is operated by the operator in the state where both the first LED 24 and the second LED 25 are turned on, the printer 1 enters the execution state to perform a printing operation of the job "001" from the computer 3B by turning on the second LED 25 corresponding to the computer 3B and turning off the first LED 24 corresponding to the computer 3A.

The printer 1 transmits the job completion notification to the computers 3A and 3B (S48) when the execution of the job is completed. The computer 3A transmits to the printer 1 the job deregistration notification indicating that the completed job is deregistered in response to the job completion notification transmitted from the printer 1 (S49).

In the printer 1 having received the job deregistering notification, as shown in the job state (e) of FIG. 8, job 2 is deregistered and gets empty and the job "001" from the computer 3B which is not executed yet is registered as job 1. The printer enters the waiting state (S50) by turning off the first LED 24 corresponding to job 2 at which time the job from the computer 3A is registered and turning on only the second LED 25 corresponding to the job "001" from the computer 3B which is not executed yet.

When the second instruction button 22 of the control panel 20 is operated by the operator, the printer 1 requests the computer 3B having transmitted the registering instruction to transmit the data of the job (S51) so as to start executing the job "001" from the computer 3B. The computer 3B transmits the data of the job to the printer 1 in response to the request transmitted from the printer 1 (S52). The printer 1 enters the execution state to perform a printing operation (S53) by turning on the second LED 25 corresponding to the job "001" of the computer 3B and turning off the first LED 24.

The printer 1 transmits the job completion notification to the computer 3B (S54) when the execution of the job is completed. The computer 3B transmits to the printer 1 the job deregistration notification indicating that the completed job is deregistered in response to the job completion notification transmitted from the printer 1 (S55). The printer 1 having received the job deregistration notification turns off the second LED 25 corresponding to the deregistered job and then enters the idle state because any job to be executed does not remain (S56, see the job state (f) of FIG. 8).

According to the embodiment of the invention as described above, in the printer 1 for executing jobs transmitted from the computers 3A and 3B to print an image on a recording medium, the object jobs corresponding to the predetermined upper limit (for example, 2) are registered on the basis of the job registration instructions transmitted from the computers 3A and 3B. When the first instruction button 21 or the second instruction button 22 of the control panel 20 is operated, the data of the job (the job transmitted from the computer corresponding to the operation in the modified example) corresponding to the operation is requested to the computers 3A and 3B and an image is printed on the basis of the data of the jobs transmitted from the computers 3A and 3B in response to the request. Accordingly, the operator operating the computers 3A and 3B can designate the execution order of the jobs by operating the control panel 20 of the printer 1. Since the lighting states of the first LED 24 and the second LED 25 corresponding to the jobs registered in the printer 1 are changed depending on the operation state and the job state of the printer 1, the operator can see the job which is being executed. Accordingly, the plural jobs transmitted from the plural computers 3A and 3B can be executed in a desired order by the printer 1, thereby satisfactorily preventing the jobs from being executed in the unintended order.

In the step of registering the jobs in the printer 1, since the data of the jobs are not transmitted from the computers 3A and 3B to the printer 1, it is not necessary to provide a memory area for storing the data of the registered jobs before the execution thereof in the printer 1. Accordingly, since it is enough if the printer 1 has the minimum memory area associated with the registration of a job, it is possible to easily embody the printer at low cost. In the step of registering the jobs, since the amount of information transmitted between the printer 1 and the computers 3A and 3B can be very small, it is possible to perform a process at a high speed.

Since the control panel 20 is provided with two of the first instruction button 21 and the second instruction button 22 and two of the first LED 24 and the second LED 25 to correspond to the jobs of the upper limit (for example, 2) which can be registered in the printer 1, the operator can operate the button corresponding to the job to be executed and check the state of the LED corresponding to the job. Accordingly, the intuitive operation is possible, thereby enhancing the operability.

When the number of jobs registered in the printer 1 reaches the upper limit, the computers 3A and 3B waits for the transmission of the job registration instruction to the printer 1. Accordingly, the jobs more than the upper limit are not transmitted from the plural computers 3A and 3B to the printer 1. Therefore, since the printer 1 executes the jobs less than or equal to the predetermined upper limit, the load on the printer 1 can be reduced, thereby accomplishing an increase in processing speed and efficiency.

The above-mentioned embodiment shows only an aspect of the invention and thus can be modified and applied without departing from the scope of the invention.

The number of computers connected to the printer 1 is not limited to 2, but more computers may be connected thereto. In this case, plural instruction buttons and LEDs corresponding to the spoolers of the computers may be disposed in the printer 1 and thus the same number of jobs as the instruction buttons and the LEDs may be registered.

A display device such as an LCD screen instead of the LEDs may be provided in the printer 1 so as to display the registration states and the execution states of the jobs on the display device. A touch panel or a cursor key incorporated into the display device may be provided instead of the first instruction button 21 and the second instruction button 22. In this case, even when many jobs are registered in the printer 1, it is possible to display the job states and to clearly instruct the execution of the jobs. Accordingly, it is possible to embody a configuration for registering plural jobs in the printer 1 regardless of the size of the control panel 20.

In this embodiment, when two jobs, which is the upper limit, are registered in the printer 1, it has been described that the computer 3A or the computer 3B enters the waiting state (S7 of FIG. 5, S37 of FIG. 7) not to transmit the job registration instruction, but the invention is not limited to the embodiment. For example, after the job registration instruction is transmitted from the computer 3A or the computer 3B, information indicating that the job registration instruction should be waited for may be transmitted from the printer 1 to the computer 3A or the computer 3B, thereby allowing the computer 3A or the computer 3B to wait.

When the printer 1 receives the job registration instructions from the computers 3A and 3B, it has been described in this embodiment that the jobs are registered as jobs 1 and 2 in the received order, but the invention is not limited to the embodiment. For example, the job transmitted from the spooler 39A may be always registered as job 1 and the job transmitted from the spooler 39B may be always registered as job 2. In this case, since the computers 3A and 3B can register one job, it does not occur that only the job from one computer is always executed. When an operator operates the first instruction button 21 or the second instruction button 22 corresponding to his own computer, the job transmitted from the computer is executed and the operator can check the job state from the LED corresponding to the computer among the first LED 24 and the second LED 25, thereby further enhancing the operability.

Plural I/F 12 may be provided in the printer 1 and computers may be connected to the plural I/F 12, respectively. The I/F 12 as a network interface may be connected to the network 4 and plural computers may be connected to the printer 1 through the network interface. Other detailed configurations can be modified variously without departing from the gist of the invention.

An example of the printer 1 according to this embodiment can include a dot impact printer, an inkjet printer, a thermal printer, and a laser printer and can also include a printer for printing an image by the use of other methods. The invention may be applied to other devices having a function of printing an image (copier).

Although the invention has been described in details with reference to the specific embodiments, it will be understood to those skilled in the art that the invention can be modified in various forms without departing from the spirit and scope of the invention. The subject application is based on Japanese Patent Application (Japanese Patent Application No. 2005-324726) filed on Nov. 9, 2005, contents of which are incorporated herein by reference.

The invention claimed is:

1. A recording system comprising a plurality of computers for transmitting a plurality of jobs and a recording apparatus for executing the jobs received from the computer, wherein the recording apparatus includes:

a controller that receives a first instruction to register a first job from one of the computers and registers the first job as a first object job, and receives a second instruction to register a second job from another of the computers and registers the second job as a second object job;

a first operation unit that inputs a first operation of instructing to execute the first job registered by the controller;

a second operation unit that inputs a second operation of instructing to execute the second job registered by the controller;

a first notification unit that notifies status of the first job registered by the controller; and a second notification unit that notifies status of the second job registered by the controller, wherein the controller requests the one of the computers to transmit data of the first job when the first operation is input by the first operation unit and requests the another of the computers to transmit data of the second job when the second operation is input by the second operation unit, wherein the first job is executed when the data of the first job is transmitted from one of the computers and the second job is executed when the data of the second job is transmitted from the another of the computers, wherein the controller deregisters one of the registered first and second jobs when the one of the first and second job is executed, wherein the controller can register a predetermined number of the jobs simultaneously, and wherein when the predetermined number of the jobs are registered by the controller, the transmission of a third instruction to register a third job from one of the computers is stopped, and when the one of the first and second jobs is executed and deregistered, the third instruction is automatically transmitted to the recording apparatus from the one of the computers.

2. The recording system according to claim 1,
wherein the first and second notification units are first and second display devices that display states of the first and second jobs registered by the controller, respectively, and
wherein when one of the first and second jobs is executed, a display state of one of the first and second display devices is changed.

3. The recording system according to claim 1, wherein each of the computers includes a CPU that transmits an instruction to register the job as an object job to the recording apparatus before transmitting data of the job,
wherein the CPU transmits the data of the job when the data of the job is requested by the recording apparatus in response to the instruction transmitted by the CPU, and
wherein the controller of the recording apparatus registers the object job when receiving the instruction from the CPU.

* * * * *